US 10,782,205 B2

(12) United States Patent
Gafur et al.

(10) Patent No.: US 10,782,205 B2
(45) Date of Patent: Sep. 22, 2020

(54) SIMPLE LEAKAGE DETECTION IN A HYDRAULIC CYLINDER UNIT (71) Applicant: Primetals Technologies Germany GmbH, Erlangen (DE)

(72) Inventors: Ilhom Gafur, Fürth (DE); Andreas Lorenz, Erlangen (DE)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 131 days.

(21) Appl. No.: 16/071,996

(22) PCT Filed: Dec. 2, 2016

(86) PCT No.: PCT/EP2016/079582
§ 371 (c)(1),
(2) Date: Jul. 23, 2018

(87) PCT Pub. No.: WO2017/129293
PCT Pub. Date: Aug. 3, 2017

(65) Prior Publication Data
US 2019/0033162 A1 Jan. 31, 2019

(30) Foreign Application Priority Data
Jan. 25, 2016 (EP) ..................... 16152531

(51) Int. Cl.
*G01M 3/26* (2006.01)
*G01M 13/005* (2019.01)
(Continued)

(52) U.S. Cl.
CPC ............... *G01M 3/26* (2013.01); *F15B 11/10* (2013.01); *F15B 19/005* (2013.01);
(Continued)

(58) Field of Classification Search
CPC ........ G01M 3/26; G01M 3/2869; G01M 3/04; G01M 3/2815; G01M 3/3236;
(Continued)

(56) References Cited

U.S. PATENT DOCUMENTS 5,829,335 A * 11/1998 Ewald .................... D01G 19/26
91/363 A
6,405,632 B1 * 6/2002 Liao ....................... A01J 5/0175
91/361

(Continued)

FOREIGN PATENT DOCUMENTS

| CN | 101315311 A | 12/2008 |
| CN | 101842760 A | 9/2010 |

(Continued)

OTHER PUBLICATIONS

Chinese Office Action, dated Aug. 30, 2019, issued in corresponding Chinese Patent Application No. 2016800800381. Total pp. 6.

(Continued)

*Primary Examiner* — Daniel S Larkin
*Assistant Examiner* — Anthony W Megna Fuentes
(74) *Attorney, Agent, or Firm* — Ostrolenk Faber LLP (57) ABSTRACT A hydraulic cylinder unit (1) having a hydraulic cylinder (2), a piston (3) which can be moved in the hydraulic cylinder (2), and a servo valve (7). The piston (3) separates working volumes (5A, 5B) of the hydraulic cylinder unit (1) from one another. The servo valve (7) is connected to a hydraulic pump (8), a tank (9), and the working volumes (5A, 5B). The servo valve (7) is supplied with a pump pressure (pP) via the hydraulic pump (8). The tank (9) has a tank pressure (pT). The servo valve (7) is adjusted to a defined valve position (y). A piston position (z) of the piston (3) in the hydraulic cylinder (2) and working pressures (pA, pB) which are applied to the working volumes (5A, 5B) are detected. An (Continued)

analysis device (12) ascertains a leakage coefficient ($\omega$) of the hydraulic cylinder unit (1) using the piston position (z), the working pressures (pA,pB), the valve position (y), the pump pressure (pP), and a value which represents the tank pressure (pT) in connection with time-invariant parameters of the hydraulic cylinder unit (1).

10 Claims, 2 Drawing Sheets

(51) Int. Cl.

| | | |
|---|---|---|
| *G01M 3/04* | (2006.01) | |
| *G01M 3/00* | (2006.01) | |
| *G01M 3/32* | (2006.01) | |
| *G01M 3/28* | (2006.01) | |
| *G01M 3/18* | (2006.01) | |
| *F16L 23/16* | (2006.01) | |
| *G01M 3/16* | (2006.01) | |
| *F16L 11/12* | (2006.01) | |
| *F15B 11/10* | (2006.01) | |
| *F15B 20/00* | (2006.01) | |
| *F15B 19/00* | (2006.01) | |

(52) U.S. Cl.
CPC ............ *F15B 20/005* (2013.01); *F16L 11/12* (2013.01); *F16L 23/167* (2013.01); *G01M 3/00* (2013.01); *G01M 3/04* (2013.01); *G01M 3/042* (2013.01); *G01M 3/165* (2013.01); *G01M 3/18* (2013.01); *G01M 3/2815* (2013.01); *G01M 3/2869* (2013.01); *G01M 3/3236* (2013.01); *G01M 13/005* (2013.01); *F15B 2211/634* (2013.01); *F15B 2211/6313* (2013.01); *F15B 2211/6336* (2013.01); *F15B 2211/7053* (2013.01); *F15B 2211/857* (2013.01); *F16L 2201/30* (2013.01)

(58) Field of Classification Search
CPC ........ G01M 13/005; G01M 3/18; G01M 3/00; G01M 3/042; G01M 3/165; F15B 11/10; F15B 20/005; F15B 19/005; F15B 2211/857; F15B 2211/7053; F15B 2211/634; F15B 2211/6336; F15B 2211/6313; F16L 2201/30; F16L 23/167; F16L 11/12

See application file for complete search history.

(56) References Cited

U.S. PATENT DOCUMENTS

| | | | | |
|---|---|---|---|---|
| 6,901,315 | B2 * | 5/2005 | Kockemann | F15B 21/08 700/275 |
| 6,988,363 | B2 * | 1/2006 | Bitter | B66F 9/065 60/468 |
| 7,062,832 | B2 * | 6/2006 | Yo | F15B 9/09 29/407.05 |
| 7,620,522 | B2 * | 11/2009 | Bredau | F15B 19/005 702/113 |
| 8,301,276 | B2 | 10/2012 | Tautz et al. | 700/68 |
| 2005/0000580 | A1 * | 1/2005 | Tranovich | F15B 13/0444 137/625.65 |
| 2010/0005844 | A1 * | 1/2010 | Felkl | B21B 37/62 72/7.2 |
| 2010/0212489 | A1 * | 8/2010 | Tautz | G05B 11/42 91/361 |

FOREIGN PATENT DOCUMENTS

| | | |
|---|---|---|
| CN | 202485867 U | 10/2012 |
| DE | 199 27 117 A1 | 12/2000 |
| DE | 10 2007 051 857 B3 | 4/2009 |
| DE | 102011075168 A1 | 11/2012 |

OTHER PUBLICATIONS

International Search Report dated Feb. 28, 2017 in corresponding PCT International Application No. PCT/EP2016/079582.
Written Opinion dated Feb. 28, 2017 in corresponding PCT International Application No. PCT/EP2016/079582.
Search Report dated Jul. 13, 2016 in corresponding European Patent Application No. 16152531.6.

* cited by examiner

FIG 1

SIMPLE LEAKAGE DETECTION IN A HYDRAULIC CYLINDER UNIT

CROSS-REFERENCE TO RELATED APPLICATIONS

The present application is a 35 U.S.C. §§ 371 national phase conversion of PCT/EP2016/079582, filed Jan. 25, 2016, which claims priority of European Patent Application No. 16152531.6, filed Jan. 25, 2016, the contents of which are incorporated by reference herein. The PCT International Application was published in the German language.

TECHNICAL BACKGROUND

The present invention proceeds from a method for establishing a leakage coefficient of a hydraulic cylinder unit. The unit has a hydraulic cylinder, a piston that is displaceable in the hydraulic cylinder and a servo valve. The piston separates a first and a second working volume of the hydraulic cylinder unit from one another. The servo valve is connected to a hydraulic pump, a tank and the first and the second working volumes.

A pump pressure is applied to the servo valve via the hydraulic pump, and the tank has a tank pressure.

The servo valve is set to a defined valve position.

A piston position of the piston in the hydraulic cylinder and a first and a second working pressure, which are applied to the first and the second working volumes are captured.

Furthermore, the present invention proceeds from a computer program for an evaluation device, wherein the computer program comprises machine code that is immediately executable by the evaluation device, wherein the machine code being executed by the evaluation device causes the evaluation device to establish the leakage coefficient.

Furthermore, the present invention proceeds from an evaluation device for establishing a leakage coefficient of a hydraulic cylinder unit having a piston that is displaceable in a hydraulic cylinder and a servo valve, wherein the piston separates a first and a second working volume of the hydraulic cylinder unit from one another, and the servo valve is connected to a hydraulic pump and a tank on the input side and to the first and the second working volume on the output side.

Furthermore, the present invention proceeds from a hydraulic cylinder unit having a piston that is displaceable in the hydraulic cylinder and a servo valve. The piston separates a first and a second working volume of the hydraulic cylinder unit from one another. The servo valve is connected to a hydraulic pump and a tank on the input side and to the first and the second working volumes on the output side.

A pump pressure is applied to the servo valve via the hydraulic pump, and the tank has a tank pressure. The servo valve is set to a defined valve position by a control device. A piston position of the piston in the hydraulic cylinder and a first and a second working pressure, which are applied to the first and the second working volumes are captured by appropriate sensors.

DE 10 2007 051 857 B3 discloses a hydraulic cylinder unit having a piston that is displaceable in a hydraulic cylinder and a hydraulic valve, wherein the piston separates a first and a second working volume of the hydraulic cylinder unit from one another. The hydraulic valve is connected to a hydraulic pump and a tank on the input side and to the first and the second working volume on the output side. A pump pressure is applied to the hydraulic valve via the hydraulic pump. The tank has a tank pressure. The hydraulic valve is set to a defined valve setting. A first and a second working pressure, which are respectively applied to the first and the second working volumes and a piston position of the piston in the hydraulic cylinder are captured.

In DE 10 2007 051 857 B3, a linearization factor ensures a uniform operation of the hydraulic cylinder unit over the entire travel of the piston. This is established on the basis of captured, time-varying variables such as, for example, the first and the second working pressures and the piston position in conjunction with further, time-invariant variables such as the effective working faces of the piston.

In DE 10 2007 051 857 B3, the hydraulic valve is embodied as a two-way valve or as a four-way valve. No further statements can be found about the configuration of the hydraulic valve.

Sealing the two working volumes from one another is necessary in a hydraulic cylinder unit. As a rule, an appropriate seal is introduced into the piston for this purpose, in particular, a ring seal. Nevertheless, in practice, a low flow of hydraulic fluid occurs from the working volume with the respective higher working pressure to the working volume with the respective lower working pressure. This flow or leakage current is proportional to the difference of the two working pressures. The associated proportionality factor is the so-called leakage coefficient.

The seal introduced into the piston is subject to wear. Initially, the wear only reduces the dynamics of the hydraulic cylinder unit. However, with increasing wear, the seal may break and may cause an abrupt failure of the hydraulic cylinder unit.

In order to prevent such a failure of the hydraulic cylinder unit, the prior art has disclosed the practice of disassembling the hydraulic cylinder unit from time to time and replacing or at least checking the seal. This procedure, firstly, is connected to an operational interruption of the hydraulic cylinder unit and, secondly, is very complicated.

Furthermore, the prior art discloses providing the hydraulic cylinder unit with special additional measuring devices, in particular with flowmeters in the hydraulic feed lines to the working volumes of the hydraulic cylinder unit. Retrofitting is complicated and expensive. In new acquisitions, the additional measuring devices also present a significant cost factor. Therefore, this solution, possible in theory, is usually not taken up in practice.

SUMMARY OF THE INVENTION

The object of the present invention consists in developing options for monitoring the internal leakage of the hydraulic cylinder unit during running operation of the hydraulic cylinder unit, without requiring such special measuring devices for establishing the leakage or the leakage coefficient, i.e., the actually significant variable.

The object is achieved by an establishing method disclosed herein.

An establishing method of the type set forth at the outset is configured such that an evaluation device receives the piston position, the first and the second working pressures and the valve position, and the evaluation device establishes the leakage coefficient on the basis of the piston position, the first and the second working pressure, the valve position, the pump pressure and a value that is representative for the tank pressure in conjunction with time-invariant parameters of the hydraulic cylinder unit.

As a result of this procedure, it is possible to reliably establish the leakage coefficient in a simple and cost-effective manner. In particular, the piston position and the first and the second working pressure, as a rule, are required in any case for the normal operation of the hydraulic cylinder unit. Often, the valve position is also known. Should an additional sensor be required for capturing the valve position, that sensor is realizable in a cost-effective and simple manner. The value that is representative for the tank pressure can be the tank pressure as such. Alternatively, the representative value can be set to zero. This is admissible because the tank pressure is negligibly small in relation to the other employed pressures, i.e., the two working pressures and the pump pressure.

Establishing the leakage coefficient is possible in a particularly reliable manner by virtue of the evaluation device establishing the leakage coefficient recursively on the basis of a sequence, wherein the sequence comprises groups of values, associated in time, of the piston position, the valve position, the first and the second working pressure, the pump pressure and the value that is representative for the tank pressure. The phrase "associated in time" means that the respective values are valid for the same instant of the operation of the hydraulic cylinder unit. Recursively establishing means that, initially, a system of equations with substantially meaningful values is initialized for the leakage coefficient and internal values of the system of equations, new values for the leakage coefficient and the internal values of the system of equations are thereupon established by inserting the values of the first group, and this procedure thereupon is continued with the values of the respective next group, in each case proceeding from the values established previously.

Preferably, the evaluation device continuously establishes a difference between a nominal leakage coefficient and the established leakage coefficient during the operation of the hydraulic cylinder unit. In this case, it is possible, in particular, for the evaluation device to trigger an alarm as soon as the absolute value of the difference exceeds a limiting value.

Furthermore, the object is achieved by a computer program disclosed herein.

A computer program of the type set forth at the outset is configured such that the machine code executed by the evaluation device causes the evaluation device to operate.

The evaluation device receives a piston position of a piston of a hydraulic cylinder unit that is displaceable in a hydraulic cylinder of the hydraulic cylinder unit. The piston separates a first working volume of the hydraulic cylinder unit that is connected to a servo valve of the hydraulic cylinder unit and a second working volume of the hydraulic cylinder unit that is connected to the servo valve from one another. A first and a second working pressure are respectively applied to the first and the second working volumes, and there is a valve position of the servo valve.

To establish a leakage coefficient of the hydraulic cylinder unit on the basis of the piston position, the first and the second working pressures, the valve position, a pump pressure of a hydraulic pump connected to the servo valve and a value that is representative for the tank pressure of a tank connected to the servo valve in conjunction with time-invariant parameters of the hydraulic cylinder unit.

In a manner analogous to the establishing method, a specific embodiment of the computer program includes execution of the machine code by the evaluation device causing the evaluation device to establish the leakage coefficient recursively on the basis of a sequence, wherein the sequence comprises groups of values, associated in time, of the piston position, the first and the second working pressure, the valve position, the pump pressure and, preferably, the value that is representative for the tank pressure.

Likewise analogously to the establishing method, a further specific embodiment of the computer program includes execution of the machine code by the evaluation device causing the evaluation device to continuously establish a difference between a nominal leakage coefficient and the established leakage coefficient during the operation of the hydraulic cylinder unit and the evaluation device triggering an alarm as soon as the absolute value of the difference exceeds a limiting value.

Furthermore, the object is achieved by an evaluation device having the features disclosed herein. According to the invention, an evaluation device of the type set forth at the outset is programmed by a computer program according to the invention.

Furthermore, the object is achieved by a hydraulic cylinder unit disclosed herein. Specific embodiments of the hydraulic cylinder unit disclosed herein.

According to the invention, a hydraulic cylinder unit of the type set forth at the outset is configured such that an evaluation device receives the piston position and the first and the second working pressure from the sensors and receives the valve position from the control device or from a further sensor. The evaluation device establishes the leakage coefficient on the basis of the piston position, the first and the second working pressure, the valve position, the pump pressure and a value that is representative for the tank pressure in conjunction with time-invariant parameters of the hydraulic cylinder unit during operation of the hydraulic cylinder unit.

In a manner analogous to the establishing method, a specific embodiment of the hydraulic cylinder unit comprises the evaluation device being embodied such that it establishes the leakage coefficient recursively on the basis of a sequence, wherein the sequence comprises groups of values, associated in time, of the piston position, the valve position, the first and the second working pressure, the pump pressure and, preferably, the tank pressure.

Likewise analogous to the establishing method, a further specific embodiment of the hydraulic cylinder unit comprises the evaluation device being embodied in such a way that it continuously establishes a difference between a nominal leakage coefficient and the established leakage coefficient during the operation of the hydraulic cylinder unit and triggers an alarm as soon as the absolute value of the difference exceeds a limiting value.

The above-described properties, features and advantages of this invention and the manner in which they are achieved will become clearer and more easily understandable in conjunction with the following description of the exemplary embodiments, which are explained in more detail in conjunction with the drawings. Here, schematically in the figures:

Figure 1:
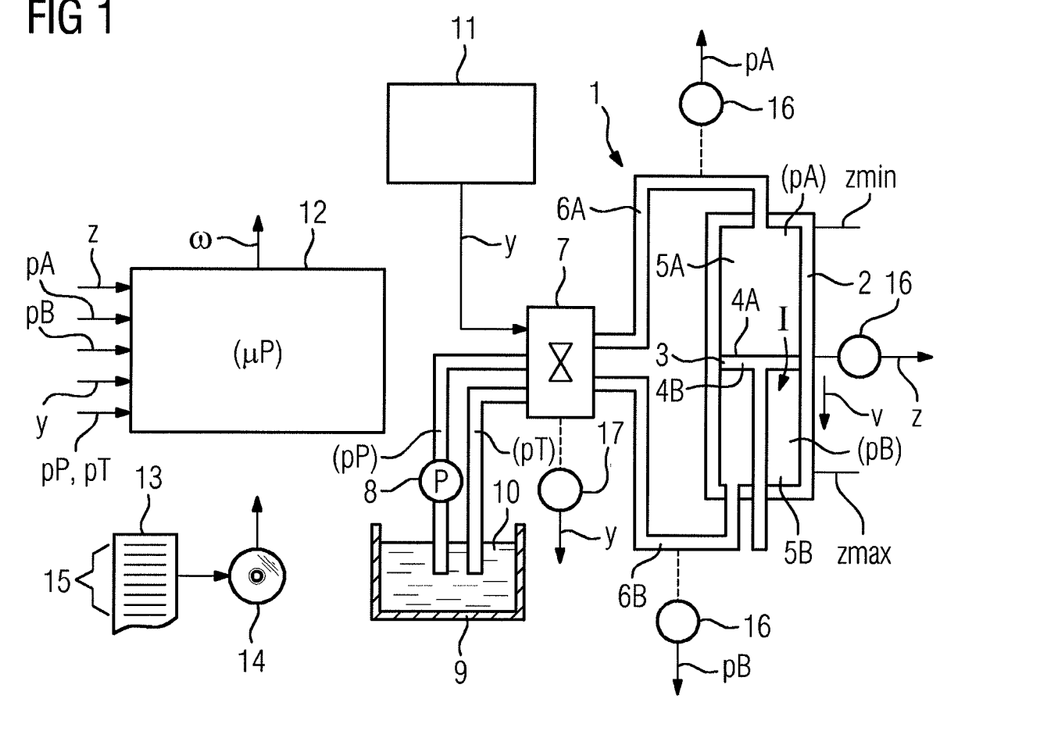
FIG. 1 shows a block diagram of a hydraulic cylinder unit including associated components and FIG. 2 shows a flowchart.

According to FIG. 1, a hydraulic cylinder unit 1 has a hydraulic cylinder 2, in which a piston 3 is movably mounted. The piston 3 is movable within the hydraulic cylinder 1 between a minimum position z min and a maximum position z max. Thus, it is situated at an actual position z that lies between the minimum position z min and the maximum position z max at all times.

The piston 3 has a first working face 4A and a second working face 4B, each respectively facing a corresponding working volume 5A, 5B. A first working pressure pA is prevalent in the working volume 5A, and a second working pressure pB is prevalent in the second working volume 5B.

The working volumes 5A, 5B are hydraulically connected to a hydraulic pump 8 and a hydraulic reservoir 9 or a tank 9 by a respective hydraulic path 6A, 6B and a servo valve 7. The hydraulic paths 6A, 6B extend from the respective working volume 5A, 5B to the servo valve 7.

A pump pressure pP is applied to the hydraulic liquid 10 by the hydraulic pump 8. A tank pressure pT is prevalent in the hydraulic reservoir 9. As a result, the pump pressure pP, the tank pressure pT and the two working pressures pA, pB are present at the servo valve 7 via the respective connector to the hydraulic pump 8, to the tank 9 and to the working volumes 5A, 5B. The pump pressure pP and the two working pressures pA, pB often have high values. By contrast, the tank pressure pT is often negligibly small in relation to the other values.

In contrast to a proportioning valve or switch valve and given the pressure pP, pT, pA and pB, the functionality of the servo valve 7 consists of a valve position y of the servo valve 7 determining both qualitatively and quantitatively which volume flows flow via the hydraulic pump 8 to which of the working volumes 5A, 5B or which volumes flows flow from which working volume 5A, 5B into the tank 9. Depending on requirements, the servo valve 7 can be embodied as a four-way valve or as a two-way valve. By means of a four-way valve, each of the two working volumes 5A, 5B can have the pump pressure pP or the tank pressure pT alternatively applied. In the case of a two-way valve, one of the two working volumes 5A, 5B has a constant pressure applied thereto, for example half the pump pressure pP. In this case, pump pressure pP or the tank pressure pT is alternatively applied to the other working volume 5A, 5B.

The piston 3 separates the two working volumes 5A, 5B from one another. Nevertheless, a leakage current I of hydraulic liquid 10 flows between the two working volumes 5A, 5B. The leakage current I is proportional to the difference between the working pressures pA, pB. Thus, the following relationship applies:

$$I = \omega \cdot (pA - pB) \quad (1)$$

Usually, the proportionality factor $\omega$ is referred to as leakage coefficient. Establishing, the leakage coefficient $\omega$ is subject matter of the present invention. This will subsequently be discussed in more detail.

The hydraulic cylinder unit 1 is controlled by a control device 11. In particular, the servo valve 7 is set in a defined manner at all times by the control device 11 to the respective valve position y that is predetermined for the respective time.

Furthermore, an evaluation device 12 is present. The evaluation device 12 is embodied as a software-programmable device, corresponding to the illustration in FIG. 1. In FIG. 1, the evaluation device 12 is illustrated as a device that differs from the control device 11. However, alternatively, the evaluation device 12 can form a unit with the control device 11.

The evaluation device 12 is programmed by a computer program 13. The computer program 13 may be supplied to the evaluation device 12 by a data medium 14, for example, in which the computer program 13 is stored in non-transitory machine-readable form. In principle, any data medium may be considered as a data medium 14. A CD-ROM 14 is illustrated (purely in an exemplary manner) in FIG. 1.

The computer program 13 comprises machine code 15 that is immediately executable by the evaluation device 12. Executing machine code 15 by the evaluation device 12 causes the evaluation device 12 to carry out a method for establishing the leakage coefficient $\omega$, which will be explained in more detail below.

Within the scope of the present invention, the piston position z of the piston 3 in the hydraulic cylinder 2 and the first and the second working pressure pA, PB are captured by appropriate sensors 16. The captured variables z, pA, pB are supplied to the evaluation device 12. The latter accepts the captured variables z, pA, pB. The variables z, pA, pB vary in time. Thus, they are newly captured at each clock cycle TS. The variables z, pA, pB captured at a certain time are constituents of a respective group of values associated in time.

The pump pressure pP and the tank pressure pT are also constituents of the respective group of values associated in time. It is possible that these variables pP, pT, too, are captured by sensors. In this case, the variables pP, pT can be variable in time, as they are newly captured with each clock cycle TS and supplied to the evaluation device 12. However, alternatively, the pump pressure pP and the tank pressure pT likewise could be constant. In this case, the pump pressure pP and the tank pressure pT must only be disclosed once to the evaluation device 12, for example by way of a parameterization of the evaluation device 12. If the tank pressure pT is parameterized, the value of 0 can be set and parameterized for the tank pressure pT in many cases.

Furthermore, the respective valve position y is a constituent of the respective group of values associated in time. The valve position y is a variable that varies over time, which must be newly supplied to the evaluation device 12 with each clock cycle TS. It is possible that the valve position y is transmitted to the evaluation device 12 from the control device 11. Alternatively, it is possible that the valve position y is captured by a further sensor 17 and supplied to the evaluation device 12 from there. It lies in the discretion of a person skilled in the art as to which of the two procedures is adopted.

The evaluation device 12 establishes the leakage coefficient co on the basis of the aforementioned values, i.e., on the basis of the piston position z, the first and the second working pressures pA, pB, the valve position y, the pump pressure pP and, preferably, the tank pressure pT. A number of further parameters of the hydraulic cylinder unit 1 are used thereby for establishing purposes in addition to the aforementioned variables. However, these further parameters do not change over time. Therefore, they need to be disclosed to the evaluation device 12 only once within the scope of a parameterization.

As a rule, the evaluation device 12 establishes the leakage coefficient $\omega$ recursively. Thus, proceeding from a previously valid solution to a system of equations established by the system of equations, the evaluation device 12 in each case establishes a new solution to the system of equations by inserting the values of a group of values associated in time. The leakage coefficient $\omega$ is part of the respective solution. The remaining part of the solution are internal values of the system of equations. The groups of values were explained above. Each group which is valid at the respective time, comprises the piston position z, the first and the second working pressure pA, pB, the valve position y, the pump pressure pP and the tank pressure pT. The system of equations is determined in such a way that the solution to the system of equations and, in particular, the leakage coefficient $\omega$ converge.

The precise procedure is explained in detail below.

The time profile of the working pressures pA, pB can be described with sufficient accuracy by the following differential equations:

$$\overset{*}{p}A = \frac{E}{VA(z)} \cdot \text{sign}(pP - pA)\left(QNAy\sqrt{\frac{pP - pA}{pN}} - AA\overset{*}{z} + \omega(pA - pB)\right) \quad (2)$$

$$\overset{*}{p}B = \quad (3)$$
$$-\frac{E}{VB(z)} \cdot \text{sign}(pB - pT)\left(QNBy\sqrt{\frac{pB - pT}{pN}} - AB\overset{*}{z} - \omega(pA - pB)\right)$$

$$\overset{*}{p}A = \frac{E}{VA(z)} \cdot \text{sign}(pA - pT)\left(QNAy\sqrt{\frac{pA - pT}{pN}} - AA\overset{*}{z} + \omega(pA - pB)\right) \quad (4)$$

$$\overset{*}{p}B = \quad (5)$$
$$-\frac{E}{VB(z)} \cdot \text{sign}(pV - pB)\left(QNBy\sqrt{\frac{pV - pB}{pN}} - AB\overset{*}{z} + \omega(pA - pB)\right)$$

If approximately 0 is assumed for the tank pressure, the equations simplify as:

$$\overset{*}{p}A = \quad (2')$$
$$\frac{E}{VA(z)} \cdot \text{sign}(pP - pA)\left(QNAy\sqrt{\frac{pP - pA}{pN}} - AA\overset{*}{z} + \omega(pA - pB)\right)$$

$$\overset{*}{p}B = -\frac{E}{VB(z)} \cdot \text{sign}(pB)\left(QNBy\sqrt{\frac{pB}{pN}} - AB\overset{*}{z} + \omega(pA - pB)\right) \quad (3')$$

$$\overset{*}{p}A = \frac{E}{VA(z)} \cdot \text{sign}(pA)\left(QNAy\sqrt{\frac{pA}{pN}} - AA\overset{*}{z} + \omega(pA - pB)\right) \quad (4')$$

$$\overset{*}{p}B = \quad (5')$$
$$-\frac{E}{VB(z)} \cdot \text{sign}(pV - pB)\left(QNBy\sqrt{\frac{pV - pB}{pN}} - AB\overset{*}{z} + \omega(pA - pB)\right)$$

In the following description, the exact equations 2 to 5 are assumed. Analogous circumstances, however, emerge if equations 2' to 5' are alternatively assumed. However, the equations are slightly simplified.

Equations 2 and 3 apply if the valve position y is greater than 0, i.e., the first working volume 5A is connected to the pump 8 via the servo valve 7 and the second working volume 5B is connected to the tank 9 via the servo valve 7. Equations 4 and 5 apply if the valve position y is less than 0, i.e., the first working volume 5A is connected to the tank 9 via the servo valve 7 and the second working volume 5B is connected to the pump 8 via the servo valve 7. The case where the valve position y equals exactly zero can (as desired) be excluded or assigned to the case where the valve position y is greater than 0 or to the case where the valve position y is less than 0.

The following applies to the parameters used in equations 2 to 5:

E is the spring constant of the hydraulic liquid 10.

VA is the volume of hydraulic liquid 10 that is situated in the hydraulic path 6A and in the first working volume 5A. The volume VA emerges as $$VA = V\min A + AA(z - z\min) \quad (6)$$

where VminA is the amount of hydraulic liquid 10 that is situated between the servo valve 7 and the working face 4A of the piston 3 when the piston 3 is situated in its minimum position z min. AA is the size of the effective working face 4A of the piston 3.

VB is analogously the volume of hydraulic liquid 10 that is situated in the hydraulic path 6B and in the second working volume 5B. The volume VB emerges as $$VB = V\min B + AB(z\max - z) \quad (7)$$

where VminB is the amount of hydraulic liquid 10 that is situated between the servo valve 7 and the working face 4B of the piston 3 when the piston 3 is situated in its maximum position z max. AB is the size of the effective working face 4B of the piston 3.

pN is a nominal pressure.

QNA is a rated volume flow which flows into the first working volume 5A in the case of the maximum valve position y if a difference between the pump pressure pP and the first working pressure pA present in the first working volume 5A equals the nominal pressure pN.

QNB is a rated volume flow which flows into the second working volume 5B in the case of the maximum valve position y if a difference between the pump pressure pP and the second working pressure pB present in the second working volume 5B equals the nominal pressure pN.

The leakage coefficient ω is included linearly in equations 2 to 5. Therefore, linear parameter estimation algorithms, as known per se, are usable, by means of which the leakage coefficient ω can be established.

Establishing the leakage coefficient ω is explained below proceeding from equations 2 and 3. Thus, it is explained for the case where the valve position y is greater than 0. However, in analogous fashion, it would also be possible to proceed from equations 4 and 5.

For the applicability of the parameter estimation algorithms, it is necessary to bring equations 2 and 3 into the form $$x = \theta H(t) \quad (8).$$

In equation 8:

x is a measurable path output value,

θ is a line vector of the unknown parameters and

H(t) is a so-called regressor vector the time-varying model.

Specifically, θ=ω applies in the present case. In particular, θ is consequently a scalar. Furthermore, x emerges as a vector with two components x1, x2, wherein the following applies for the components x1, x2:

$$x1 = \overset{*}{p}A - \frac{E}{VA(z)} \cdot \text{sign}(pV - pA)\left(QNAy\sqrt{\frac{pV - pA}{pN}} - AA\overset{*}{z}\right) \quad (9)$$

$$x2 = \overset{*}{p}B - \frac{E}{VB(z)} \cdot \text{sign}(pB - pT)\left(QNBy\sqrt{\frac{pB - pT}{pN}} - AB\overset{*}{z}\right) \quad (10)$$

In analogous fashion, H(t) emerges as a vector with two components H1, H2, wherein the following applies for the components H1, H2:

$$H1(t) = \frac{E}{VA(z)} \cdot \text{sign}(pV - pA) \cdot (pA - pB) \quad (11)$$

-continued $$H2(t) = \frac{E}{VB(z)} \cdot \text{sign}(pB - pT) \cdot (pA - pB) \quad (12)$$

As a result, two linearly independent measured values x1, x2 are consequently available for the parameter estimation problem. The two measured values x1, x2 can be used to carry out the estimation of the parameter θ=ω.

The parameter estimation problem is formulated as a state observation problem, in which the following is set as a system to be observed:

$$\overset{*}{\vartheta} = 0 \quad (13)$$

$$x := \begin{bmatrix} x1 \\ x2 \end{bmatrix} = \begin{bmatrix} H1(t) \\ H2(t) \end{bmatrix} \cdot \theta =: H(t) \cdot \theta \quad (14)$$

This assumption $\overset{*}{\vartheta} = 0$ can be made because the leakage coefficient ω only changes slowly, in relation to a sequence of measurements of the values explained above, and because, further, the relationship θ=ω applies.

In equation 14, some of the variables to be inserted are constant. By way of example, this applies to the rated pressure pN and the spring constant E of the hydraulic liquid 10. Some further variables are time varying or can be time varying. In particular, this relates to the piston position z, the first and the second working pressures pA, pB and the valve position y. The variables z, pA, pB, y are readily capturable by means of measuring technology, for example by means of appropriate sensors 16. In respect of the valve position y, it is even possible for the latter not having to be captured by measuring technology but being provided by the control device 11. The pump pressure pP and the tank pressure pT are either varying in time or constant in time. In one case, the pump pressure pP and the tank pressure pT can be readily captured by means of appropriate sensors. In another case, they need only be parameterized in any case, wherein, furthermore, the tank pressure pT optionally can be set to the value of 0 within the scope of the parameterization. Therefore, all these variables can be readily established and inserted into equation 14.

However, the terms x1, x2 of the equation 14 also contain the derivative of the working pressures pA, pB and of the piston position z with respect to time. Establishing the derivative of the piston position z with respect to time is possible without problems. However, the values for the working pressures pA, PB vary too strongly. Therefore, the derivative with respect to time cannot be established directly—with a meaningful result therefrom. Nevertheless, the system of equations according to equation 14 can be solved. This is explained below.

The system of equations according to equation 14 is subjected to filtering. The filter function G of the filter is chosen in such a way that it has a relative degree of at least 1. If g1 and g2 denote polynomial functions of the (complex) frequency parameter s and, furthermore, the filter function G emerges as $$G = \frac{g1(s)}{g2(s)} \quad (15)$$

the polynomial g1(s) therefore has at least one zero less than the polynomial g2(s).

The variables arising from the filtering are distinguished from the unfiltered variables x, x1, x2, H, H1, H2 below by virtue of the addition F being added to the filtered variables in each case. Thus, the filtered variables are denoted below as xF, x1F, x2F, HF, H1F and H2F. Furthermore, L denotes the Laplace transform.

Consequently, the following applies to the filtered variable x1F:

$$L(x1F) := \quad (16)$$

$$G(s) \cdot L\left(\overset{*}{p}A - \frac{E}{VA(z)} \cdot \text{sign}(pP - pA) \cdot \left(QNAy\sqrt{\frac{pP - pA}{pN}} - AA\overset{*}{z}\right)\right)$$

By exploiting the linearity of the Laplace transform, the following is obtained:

$$L(x1F) = G(s) \cdot L(\overset{*}{p}A) - \quad (17)$$

$$G(s) \cdot L\left(\frac{E}{VA(z)} \cdot \text{sign}(pP - pA) \cdot \left(QNAy\sqrt{\frac{pP - pA}{pN}} - AA\overset{*}{z}\right)\right)$$

On account of the fact that the filter function G(s) has a relative degree of at least 1, the following relationship furthermore applies:

$$G(s)L(\dot{p}A) = G(s) \cdot s \cdot L(pA) \quad (18)$$

Consequently, the following is obtained from an inverse Laplace transform:

$$x1F = L^{-1}(G(s) \cdot s \cdot L(pA)) - \quad (19)$$

$$\frac{E}{VA(z)} \cdot \text{sign}(pP - pA) \cdot \left(QNA \cdot y \cdot \sqrt{\frac{pP - pA}{pN}} - AA \cdot \overset{*}{z}\right)$$

As a result, it is therefore possible to establish the filtered variable x1F without requiring a derivative of the first working pressure pA with respect to time. Only the first working pressure pA itself is required.

Naturally, an analogous statement applies to x2F. Here, too, it is not the derivative of the second working pressure pB with respect to time but only the second working pressure pB itself that is required for the purposes of establishing the filtered variable x2F.

Naturally, the right-hand side of the equation 14 is also filtered, analogously to the left-hand side of the equation 14. Consequently, the following system of equations that is equivalent to equations 13 and 14 is obtained:

$$\dot{\theta} = 0 \quad (20)$$

$$xF = HF(t) \cdot \theta \quad (21)$$

In this system of equations, the vectors xF and HF, in particular, or the components x1F, x2F, H1F, H2F thereof, are variables that can only be established with significant computational outlay, but they are establishable, to be precise with good accuracy. This is in contrast to the original system of equations, of equations 13 and 14, in which the variables H1 and H2 are very easily establishable, but, by contrast, the variables x1 and x2 are not establishable or are not establishable with a sufficient accuracy.

Consequently, the object now lies in undertaking an asymptotic reconstruction of the sought state θ (where θ=ω applies), by using the sequence of "measurements" xF.

The system defined by equations 20 and 21 is a linear timevariant (LTV) system. Therefore, a Luneburg observer does not suffice to reconstruct the state θ. Instead, a Kalman filter is used to reconstruct the state θ.

The Kalman filter is a time-discrete system. Therefore, equations 20 and 21 are discretized. In this way, equations 22 and 23 are obtained:

$$\vartheta_{k+1} = \vartheta_k \quad (22)$$

$$xF_k = \begin{pmatrix} H1F(TS \cdot k) \\ H2F(TS \cdot k) \end{pmatrix} \cdot \vartheta_k =: HF_k \cdot \vartheta_k \quad (23)$$

TS is the cycle clock or the time constant, with which the "measurements" x follow one another. k is an index that represents the respective sampling time.

The structure and the equations of the Kalman filter are as follows:

$$K_k = P_{k-1} HF_k^T (HF_k P_{k-1} HF_k^T + R)^{-1} \quad (24)$$

$$\theta_k = \theta_{k-1} + K_k(x_k - HF_k \theta_{k-1}) = \theta_{k-1} + K_k e_k \quad (25)$$

$$P_k = (1 - K_k HF_k)^2 P_{k-1} + K_k R K_k^T \quad (26)$$

The variables K, P, $HF^T$ and R, which have not yet been defined previously, occur in equations 24 to 26. They have the following meanings:

K is a Kalman gain. In the present case, the Kalman gain is a vector with two components.
P is a scalar covariance factor.
$HF^T$ is the transpose of the filtered regressor vector HF.
R is the variance of the measurement noise. The variance R relates to the filtered "measurement" xF.
e is, as emerges from equation 25, the deviation of the k-th filtered "measurement" $xF_k$ from the (k−1)-th estimate $HF_{k-1}\theta$.

If the covariance factor $P_{k-1}$ has a value of 0, the Kalman gain $K_k$ likewise becomes 0 on account of equation 24. As a result, the k-th estimate of the parameter ϑ, i.e. the value $\theta_k$, is no longer changed in equation 25. However, since long-term monitoring within the scope of error detection is sought after by means of the procedure according to the invention, the filtering must remain adaptive. Consequently, it is necessary to ensure that the covariance factor $P_{k-1}$ always has a value above 0. On the other hand, the covariance factor $P_{k-1}$ should not be able to assume arbitrarily large values so that numerical stability is ensured. This is achieved by virtue of equation 26 being replaced by the following equation 27:

$$P_k = \lambda(1 - K_k HF_k)^2 P_{k-1} + K_k R K_k^T \quad (27)$$

$K^T$ is the transpose of the Kalman gain. λ is a learning rate. By way of example, the following applies to the learning rate λ:

$$\lambda = \lambda 0 \left(1 - \frac{\|P_{k-1}\|}{k0}\right) \quad (28)$$

λ0 has the meaning of a maximum learning rate; k0 has the meaning of a maximum covariance.

The system consisting of equations 24, 25, 27 and 28 represents a fully functional solution of the present invention.

In order to make the estimation algorithm more robust and, in particular, in order to counteract a parameter drift, equation 25 can furthermore be replaced by the following equation:

$$\vartheta_k = \vartheta_{k-1} + K_k DZ(e_k) \quad (29)$$

DZ is a dead zone or insensitive zone. The following applies to the dead zone DZ:

$$DZ := \begin{cases} e_k - d & \text{for } e_k > d \\ 0 & \text{for } -d < e_k < d \\ e_k + d & \text{for } e_k < -d \end{cases} \quad (30)$$

d determines the size of the dead zone DZ. Preferably, the numerical value for d corresponds substantially to the typical noise of the deviation e. By way of example, a suitable numerical value for d can be established by observing the system, or it can be discovered through trials.

Figure 2:
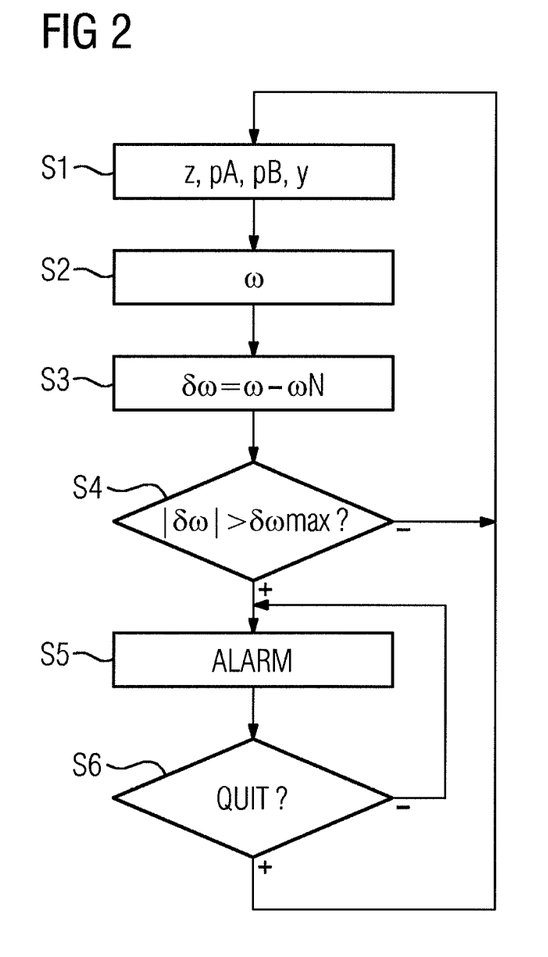

Consequently, by way of the procedure explained above, it is possible that the evaluation device 12, in accordance with the presentation in FIG. 2, accepts the piston position z of the piston 3, the working pressures pA, pB of the working volumes 5A, 5B and the valve position y of the servo valve 7 in each case in a step S1, possibly after a corresponding parameterization. To the extent that this is necessary, the evaluation device 12 accepts additional further values in step S1, such as the pump pressure pP and the tank pressure pT, for example. Thereupon, building on the values accepted in step S1, the evaluation device 12 establishes the leakage coefficient ω in a step S2. Step S2 was explained in detail above. In a step S3, the evaluation device 12 establishes the difference δω between the established leakage coefficient ω and a predetermined nominal leakage coefficient ωN. In a step S4, the evaluation device 12 compares the established difference δω, more precisely: the magnitude or absolute value thereof, with a limiting value δω max. As soon as the magnitude or the absolute value of the difference δω exceeds the limiting value δω max, the evaluation device 12 proceeds to a step S5. In step S5, the evaluation device 12 triggers an alarm. Otherwise, it does not carry out step S5. In particular, the alarm can be embodied as an optical alarm, which is output by way of a viewing appliance to an operating person. Thereupon, the operating person can introduce maintenance of the hydraulic cylinder unit 1, for example.

The evaluation device 12 carries out steps S1 to S4 and hence, in particular, the establishment of the leakage coefficient ω and the difference δω, as well as a comparison with the limiting value δω max, during the operation of the hydraulic cylinder unit 1. Furthermore, the evaluation device 12 carries out steps S1 to S4 continuously. However, when the evaluation device 12 transitions from step S4 to step S5, the alarm notification is maintained until it is acknowledged in a step S6, for example by the operating person.

In summary, the present invention consequently relates to the following circumstances:

A hydraulic cylinder unit 1 has a hydraulic cylinder 2, a piston 3 that is displaceable in the hydraulic cylinder 2 and a servo valve 7. The piston 3 separates a first and a second working volume 5A, 5B of the hydraulic cylinder unit 1 from one another. The servo valve 7 is connected to a hydraulic pump 8, a tank 9 and the first and the second working volume 5A, 5B. A pump pressure pP is applied to the servo valve 7 via the hydraulic pump 8. The tank 9 has a tank pressure pT. The servo valve 7 is set to a defined valve position y. A piston position z of the piston 3 in the hydraulic cylinder 2 and a first and a second working pressure pA, pB, which are applied to the first and the second working volume 5A, 5B, are captured. An evaluation device 12 establishes a leakage coefficient co of the hydraulic cylinder unit 1 on the basis of the piston position z, the first and the second working pressure pA, pB, the valve position y, the pump pressure pP and the tank pressure pT in conjunction with time-invariant parameters of the hydraulic cylinder unit 1.

The present invention has many advantages. In particular, the procedure according to the invention allows the leakage coefficient ω to be robustly estimated on the basis of measured values that arise in any case during the running operation of the hydraulic cylinder unit 1. A deviation of the established leakage coefficient ω from a nominal or expected leakage coefficient then can be used to trigger an alarm or to indicate an upcoming change of seal to the operating staff. Furthermore, the reliability and availability of the hydraulic cylinder unit 1 is increased since a complicated replacement of the internal ring seal can be planned during a regular servicing interval, without having to fear premature failing of the seal and without having to replace the seal prematurely before the end of its service life. The solution according to the invention is cost-efficient and realizable without noteworthy changes to the hardware. Complicated special hardware (in particular flowmeters) are not required.

Even though the invention was illustrated in more detail and described by way of the preferred exemplary embodiment, the invention is not restricted by the disclosed examples and other variations can be derived herefrom by a person skilled in the art, without departing from the scope of protection of the invention.

LIST OF REFERENCE SIGNS

1 Hydraulic cylinder unit
2 Hydraulic cylinder
3 Piston
4A, 4B Working faces
5A, 5B Working volumes
6A, 6B Hydraulic paths
7 Servo valve
8 Hydraulic pump
9 Hydraulic reservoir/tank
10 Hydraulic liquid
11 Control device
12 Evaluation device
13 Computer program
14 Data medium
15 Machine code
16 Sensors
17 Further sensor
AA, AB Size of the effective working faces
DZ Dead zone
E Spring constant of the hydraulic liquid
e Deviation
G Filter function
g1, g2 Polynomials
H, HF Regressor vectors
H1, H2, H1F, H2F Components of the regressor vectors
I Leakage current
L Laplace transform
K Kalman gain
k Index
k0 Maximum covariance
P Covariance factor
pA, pB Working pressures
pN Rated pressure
pP Pump pressure
pT Tank pressure
QNA, QNB Rated volume flows
R Variance of the measurement noise
s Frequency parameter
S1 to S6 Steps
TS Time constant
VA, VB Volumes
VminA, VminB Minimum volumes
x, xF Path output values
x1, x2, x1F, x2F Components of the path output values
y Valve position
z Piston position
z max Maximum position of the piston
z min Minimum position of the piston
δω Difference
δω max Limiting value
λ Learning rate
λ0 Maximum learning rate
θ Unknown parameter
ω Leakage coefficient
ωN Nominal leakage coefficient

The invention claimed is:

1. A method for establishing a leakage coefficient of a hydraulic cylinder unit:
the hydraulic cylinder unit comprising:
a hydraulic cylinder;
a piston that is located in and is displaceable in the hydraulic cylinder, the piston separates a first and a second working volume of the hydraulic cylinder unit from each other;
a servo valve;
a hydraulic pump, a tank and the first and the second working volumes to which the servo valve is connected;
the method comprising:
applying a pump pressure to the servo valve via the hydraulic pump; and the tank has a tank pressure;
setting the servo valve to a defined valve position;
capturing a piston position of the piston in the hydraulic cylinder and a first and a second working pressure when they are respectively applied to the first and the second working volumes;
receiving the piston position, the first and the second working pressures and the valve position by an evaluation device; and
establishing the leakage coefficient by the evaluation device on the basis of the piston position, the first and the second working pressures, the valve position, the pump pressure and a value that is representative for the tank pressure in conjunction with time-invariant parameters of the hydraulic cylinder unit.

2. The method for establishing as claimed in claim 1, further comprising:
establishing the leakage coefficient recursively by the evaluation device based on a sequence, comprising groups of values, associated in time, of the piston position, the first and the second working pressures, the valve position, the pump pressure and the value that is representative for the tank pressure.

3. The method as claimed in claim 1, further comprising:
continuously establishing by the evaluation device a difference between a nominal leakage coefficient and the established leakage coefficient during the operation of the hydraulic cylinder unit; and triggering an alarm by the evaluation device as soon as an absolute value of the difference exceeds a limiting value.

4. A computer program product comprising a non-transitory storage medium storing a computer program for an evaluation device; the computer program comprises: a machine code that is immediately executable by the evaluation device, wherein the machine code being executed by the evaluation device causes the evaluation device to receive a piston position of a piston of a hydraulic cylinder unit, the piston is displaceable in a hydraulic cylinder of the hydraulic cylinder unit and the piston separates a first working volume of the hydraulic cylinder unit that is connected to a servo valve of the hydraulic cylinder unit, from a second working volume of the hydraulic cylinder unit that is connected to the servo valve, thereby separating the first and second working volumes from each other; apply a first working pressure and a second working pressure to the first and second working volumes respectively, and set a valve position to the servo valve; establish a leakage coefficient of the hydraulic cylinder unit based on the piston position, the first and second working pressure, the valve position, a pump pressure of a hydraulic pump connected to the servo valve and a value that is representative for a tank pressure of a tank connected to the servo valve in conjunction with time-invariant parameters of the hydraulic cylinder unit.

5. The computer program product as claimed in claim 4, further comprising:
the execution of the machine code by the evaluation device causes the evaluation device to establish the leakage coefficient recursively based on a sequence comprising groups of values, associated in time, of the piston position, the first and the second working pressures, the valve position, the pump pressure and a value that is representative for the tank pressure.

6. The computer program as claimed in 5, further comprising: the execution of the machine code by the evaluation device causing the evaluation device to continuously establish a difference between a nominal leakage coefficient and the established leakage coefficient during operation of the hydraulic cylinder unit and to cause the evaluation device to trigger an alarm as soon as an absolute value of the difference exceeds a limiting value.

7. An evaluation device for establishing a leakage coefficient of a hydraulic cylinder unit comprising:
a hydraulic cylinder, a piston that is displaceable in the hydraulic cylinder and a servo valve;
the piston separates a first and a second working volume of the hydraulic cylinder unit (1) from each other;
the servo valve is connected to a hydraulic pump, a tank and the first and the second working volumes; and
the evaluation device is programmed with a computer program as claimed in claim 4.

8. A hydraulic cylinder unit comprising: a hydraulic cylinder, a position displaceable in the hydraulic cylinder and a servo valve; the piston separates a first and a second working volume of the hydraulic cylinder unit from each other, a hydraulic pump to which the servo valve is connected, a tank and the first and second working volumes are connected to the servo valve; the hydraulic pump is configured to apply a pump pressure to the servo valve, and the tank has a tank pressure; the servo valve is configured to be set to a defined valve position; the piston has a piston position in the hydraulic cylinder; a first and a second working pressure applied to the first and the second working volumes, respectively; sensors configured to capture the first and the second working pressures; an evaluation device configured to receive the piston position and the first and the second working pressures from the sensors and to receive the valve position from a control device or from a further sensor; and the evaluation device is configured to establish a leakage coefficient on the basis of the piston position, the first and the second working pressure, the valve position, the pump pressure and a value that is representative for the tank pressure in conjunction with time-invariant parameters of the hydraulic cylinder unit.

9. The hydraulic cylinder unit as claimed in claim 8, further comprising:
the evaluation device is configured to establish the leakage coefficient recursively on the basis of a sequence, wherein the sequence comprises groups of values, associated in time, of the piston position, the first and the second working pressure, the valve position, the pump pressure and the value that is representative for the tank pressure.

10. The hydraulic cylinder unit as claimed in claim 8, further comprising the evaluation device is configured to continuously establish a difference between a nominal leakage coefficient and the established leakage coefficient during the operation of the hydraulic cylinder unit and;
the evaluation device is configured to trigger an alarm as soon as the absolute value of the difference exceeds a limiting value.

* * * * *